(12) United States Patent
Bryson et al.

(10) Patent No.: US 11,492,117 B2
(45) Date of Patent: Nov. 8, 2022

(54) DUAL BUS ARCHITECTURE FOR HIGH RELIABILITY CONTROL OF HELICOPTER HOIST

(71) Applicant: GOODRICH CORPORATION, Charlotte, NC (US)

(72) Inventors: Richard Bryson, Yorba Linda, CA (US); Owen Riehle, Orange, CA (US)

(73) Assignee: Goodrich Corporation, Charlotte, NC (US)

( * ) Notice: Subject to any disclaimer, the term of this patent is extended or adjusted under 35 U.S.C. 154(b) by 308 days.

(21) Appl. No.: 16/436,320

(22) Filed: Jun. 10, 2019

(65) Prior Publication Data

US 2020/0385250 A1    Dec. 10, 2020

(51) Int. Cl.
*B66D 1/48* (2006.01)
*B66D 1/74* (2006.01)
*B64D 1/22* (2006.01)
*H04L 12/40* (2006.01)

(52) U.S. Cl.
CPC .............. *B64D 1/22* (2013.01); *B66D 1/48* (2013.01); *B66D 1/7447* (2013.01); *H04L 12/40182* (2013.01)

(58) Field of Classification Search
CPC .......... B64D 1/22; B64D 25/00; B64D 25/02; B64D 25/06; H04L 12/40182; B66D 1/48; B66D 1/7447; B66D 1/12; B66D 1/485; B66D 3/10; B66D 3/20; B66D 1/60; B66D 1/54; B66D 1/46; B64C 2201/182; B64C 25/26; B64C 27/04; B66C 23/18; B66C 13/40; G06F 13/20
See application file for complete search history.

(56) References Cited

U.S. PATENT DOCUMENTS

| 5,671,912 A * | 9/1997 | Langford ................. B66D 1/54 |
| | | 188/77 R |
| 6,446,761 B1 * | 9/2002 | Motoyama ................ B66B 1/34 |
| | | 187/247 |

(Continued)

FOREIGN PATENT DOCUMENTS

| EP | 3070045 | 9/2016 |
| WO | 2014154764 | 10/2014 |

OTHER PUBLICATIONS

European Patent Office, European Search Report dated Jul. 15, 2020 in Application No. 19216058.8.

(Continued)

*Primary Examiner* — Hoang-Chuong Q Vu
(74) *Attorney, Agent, or Firm* — Snell & Wilmer L.L.P.

(57) ABSTRACT

A control system for a rescue hoist attached to an aircraft is disclosed. In various embodiments, the control system includes a first bus extending between a control module of the rescue hoist and a control input device; and a second bus extending between the control module of the rescue hoist and the control input device. The first bus is configured to transmit a first signal from the control input device to the control module and the second bus is configured to transmit a second signal from the control input device to the control module, both the first signal and the second signal being generated by the control input device in response to a manipulation of the control input device.

15 Claims, 4 Drawing Sheets

(56) References Cited

U.S. PATENT DOCUMENTS

| | | | |
|---|---|---|---|
| 6,496,766 B1* | 12/2002 | Bernold | B66C 15/065 |
| | | | 212/276 |
| 8,590,841 B1 | 11/2013 | Hall et al. | |
| 9,771,243 B2 | 9/2017 | Kattainen et al. | |
| 2004/0007430 A1* | 1/2004 | Motoyama | B66B 1/34 |
| | | | 187/391 |
| 2005/0098768 A1* | 5/2005 | Malek | B66C 15/065 |
| | | | 254/267 |
| 2009/0146015 A1* | 6/2009 | Schievelbusch | B64D 45/0005 |
| | | | 244/213 |
| 2010/0237306 A1* | 9/2010 | Eschelbacher | B66D 1/54 |
| | | | 254/362 |
| 2012/0267200 A1* | 10/2012 | Harkonen | B66B 5/04 |
| | | | 187/294 |
| 2013/0154319 A1 | 6/2013 | Nouvel et al. | |
| 2013/0271152 A1* | 10/2013 | Kattainen | G01R 31/2836 |
| | | | 324/537 |
| 2014/0027564 A1* | 1/2014 | Mercer | B64C 13/341 |
| | | | 244/17.13 |
| 2014/0216171 A1* | 8/2014 | Kettenbach | G01L 1/22 |
| | | | 73/862.56 |
| 2015/0075915 A1* | 3/2015 | Stolt | B66B 1/30 |
| | | | 187/247 |
| 2017/0283212 A1 | 10/2017 | Herkel et al. | |
| 2018/0244509 A1 | 8/2018 | Curran et al. | |
| 2018/0282130 A1 | 10/2018 | Kale et al. | |
| 2019/0073072 A1* | 3/2019 | Van Der Werff | G06F 3/0446 |
| 2019/0375616 A1* | 12/2019 | Zhao | B66C 13/18 |

OTHER PUBLICATIONS

N J 08405 et al: "DOT/FAA/CT-86/44 4 Digital System Bus Integrity—FAA Technical Center Atlantic City International Airport—IASA-CR-18IU46) Digital Systbh Bus M88-I 0 0 3 3", Mar. 31, 1987 (Mar. 31, 1987), XP055712310, Retrieved from the Internet: URL:https://ntrs.nasa.gov/archive/nasa/cas i.ntrs.nasa.gov/1988000064.pdf [retrieved on Jul. 7, 2020].

* cited by examiner

DUAL BUS ARCHITECTURE FOR HIGH RELIABILITY CONTROL OF HELICOPTER HOIST

FIELD

The present disclosure relates generally to hoists and, more particularly, to hoists used with rescue aircraft.

BACKGROUND

Hoists used in rescue or similar operations typically wind or unwind a cable in order to raise or lower persons or cargo from a flying platform. For example, a rescue hoist may be mounted to a frame or support structure of an aircraft, such as, for example, a helicopter. The rescue hoist may include a cable drum to which the cable is attached. The cable drum rotates in one direction to spool the cable onto the drum and in the other direction to spool the cable off the drum, with one end of the cable attached to the cable drum and the other end, which may include a hook or other device, freely deployed. The hoist typically includes a gear reduction mechanism disposed between a motor and the cable drum to provide a desired rotational speed of the cable drum during operation. The gear reduction mechanism typically includes several shafts arranged to induce large torques or radial loads, thus necessitating robust bearings and other supporting components within the hoist. A load brake or clutch may be incorporated into the hoist to control operation of the cable drum during the raising or lowering of loads via the cable.

Certifying authorities typically expect control systems used to operate rescue hoists on aircraft possess a quality assurance level sufficient to guarantee safety of the aircraft and the personnel operating the aircraft. One standard and well-recognized quality assurance level is often referred to as Design Assurance Level ("DAL"). Current specifications relating to the DAL level of the control systems used in aircraft are provided in RTCA DO178C (USA) ("*Software Considerations in Airborne Systems and Equipment Certification*," dated Dec. 13, 2011) or ED-12C (the European equivalent of DO178C). The DAL level specifications for the control systems used to operate a rescue hoist are typically considered to fall within the DAL B category, which specifies that the rescue hoist be generally safe from failures that have a potential for negatively impacting the safety or performance of the aircraft or for reducing the ability of the crew to operate the aircraft. However, certain sub-systems of a rescue hoist, such as, for example, a cable-cut mechanism, are subject to the more stringent DAL A standard, while other subsystems, such as, for example, data storage devices, are subject to the less stringent DAL C standard.

SUMMARY

A control system for a rescue hoist attached to an aircraft is disclosed. In various embodiments, the control system includes a first bus extending between a control module of the rescue hoist and a control input device; and a second bus extending between the control module of the rescue hoist and the control input device. The first bus is configured to transmit a first signal from the control input device to the control module and the second bus is configured to transmit a second signal from the control input device to the control module, both the first signal and the second signal being generated by the control input device in response to a manipulation of the control input device.

In various embodiments, the control module is configured to compare the first signal against the second signal. In various embodiments, the control module is configured to respond to a command signal generated by the control input device, the command signal embodied in the first signal and the second signal, when the control module determines the first signal is the same as the second signal. In various embodiments, the control module is configured to not respond to the command signal generated by the control input device when the control module determines the first signal is not the same as the second signal.

In various embodiments, the first bus comprises one of a first CAN-Bus or a first ARINC429-Bus and defines a DAL C level of reliability. In various embodiments, the second bus comprises one of a second CAN-Bus or a second ARINC429-Bus and defines the DAL C level of reliability. In various embodiments, the control system defines a DAL B level of reliability. In various embodiments, a storage device is coupled to the control module via a storage bus and configured store a command signal generated by the control input device, the command signal embodied in the first signal and the second signal. In various embodiments, the storage bus comprises a third bus.

A rescue system for an aircraft is disclosed. In various embodiments, the rescues system includes a rescue hoist; a control input device configured to provide a command signal to the rescue hoist; a first bus extending between a control module of the rescue hoist and the control input device; and a second bus extending between the control module of the rescue hoist and the control input device. The first bus is configured to transmit a first signal from the control input device to the control module and the second bus is configured to transmit a second signal from the control input device to the control module, both the first signal and the second signal being generated by the control input device in response to a manipulation of the control input device.

In various embodiments, the control module is configured to compare the first signal against the second signal. In various embodiments, the control module is configured to respond to the command signal, the command signal embodied in the first signal and the second signal, when the control module determines the first signal is the same as the second signal. In various embodiments, the control module is configured to not respond to the command signal when the control module determines the first signal is not the same as the second signal. In various embodiments, the first bus defines a DAL C level of reliability and the second bus defines the DAL C level of reliability. In various embodiments, a control system comprising the first bus and the second bus defines a DAL B level of reliability. In various embodiments, a storage device is coupled to the control module via a third bus and configured to store the command signal.

A method of controlling a rescue hoist for an aircraft is disclosed. In various embodiments, the method includes the steps of: transmitting a first signal across a first bus extending between a control module of the rescue hoist and a control input device; transmitting a second signal across a second bus extending between the control module of the rescue hoist and the control input device; and comparing the first signal against the second signal to determine whether the first signal is the same as the second signal.

In various embodiments, the control module is configured to respond to a command signal generated by the control input device, the command signal embodied in the first signal and the second signal, when the control module determines the first signal is the same as the second signal. In various embodiments, the control module is configured to not respond to the command signal generated by the control input device when the control module determines the first signal is not the same as the second signal.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

Figure 1A:
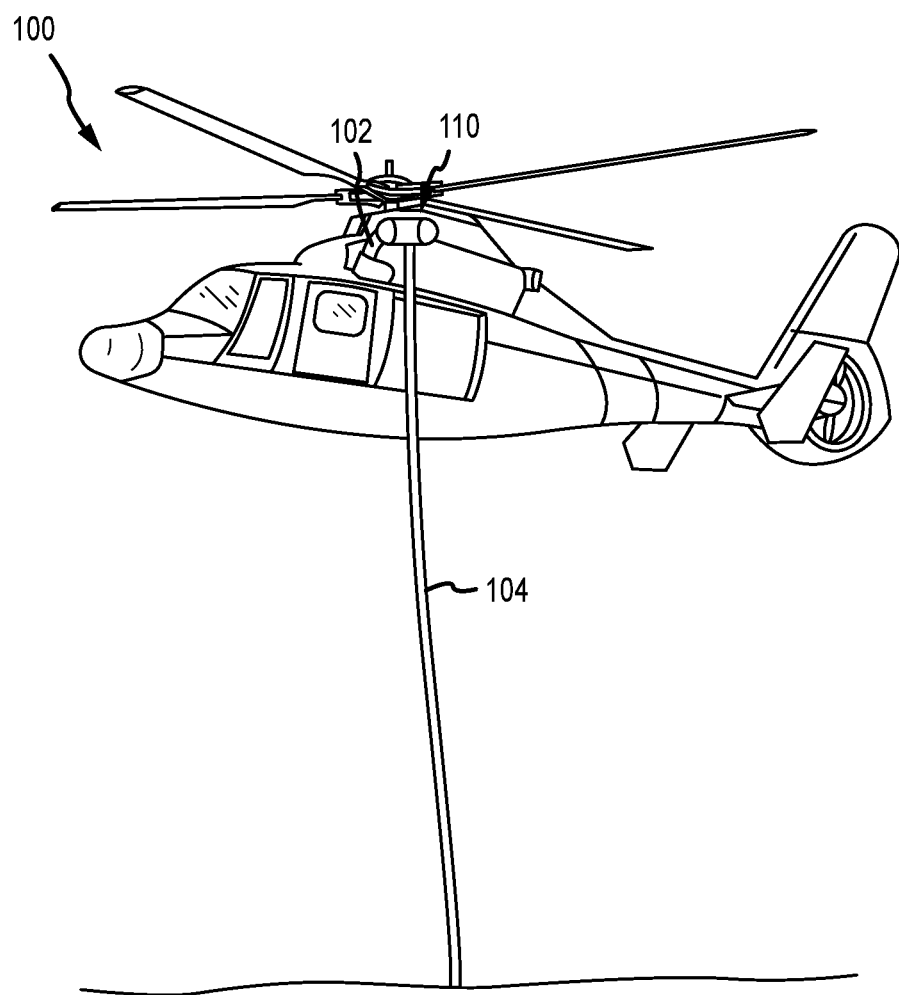
FIG. 1A is an elevation view of an aircraft and a hoist, in accordance with various embodiments.
Figure 1B:
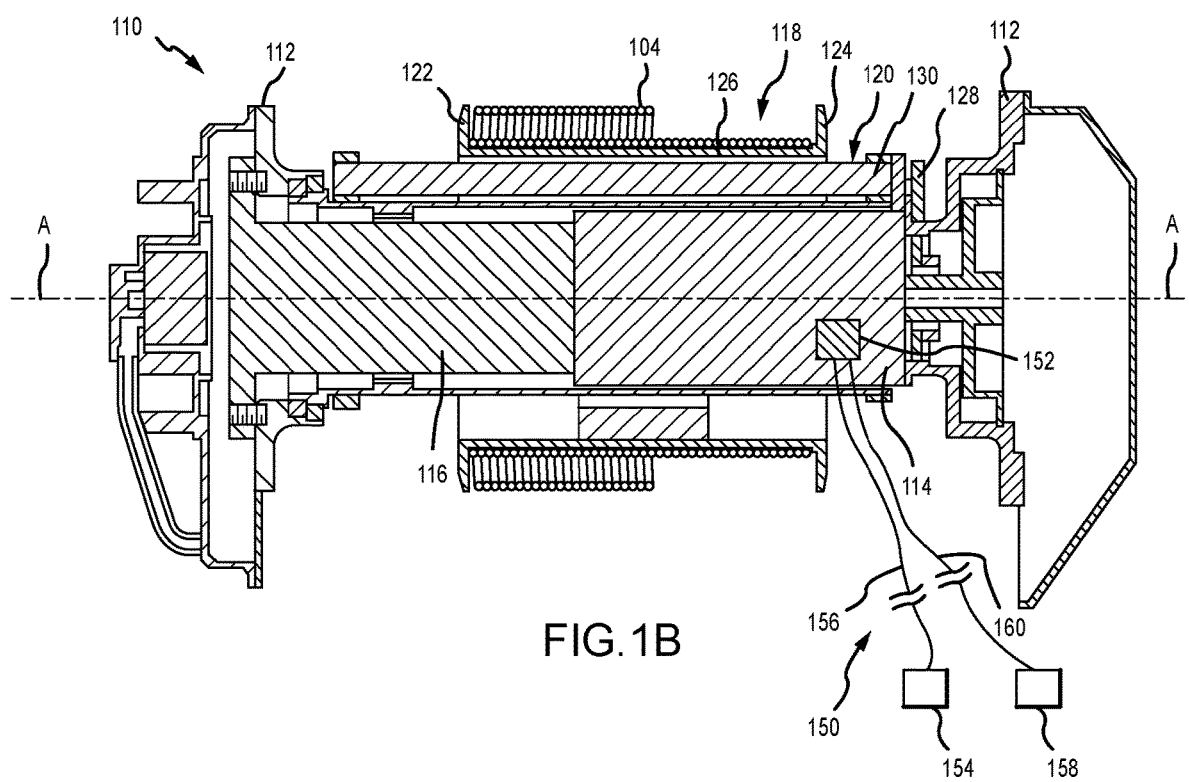
FIG. 1B is a cross-sectional view of a hoist, in accordance with various embodiments.

Referring now to the drawings, FIG. 1A provides a perspective view of an aircraft 100 and a rescue hoist 110 mounted to the aircraft 100, while FIG. 1B provides a cross-sectional view of the rescue hoist 110, in accordance with various embodiments. The rescue hoist 110 is mounted to the aircraft 100 by a support frame 102 and a cable 104 extends from the rescue hoist 110. Referring more specifically to FIG. 1B, in various embodiments, the rescue hoist 110 includes a hoist frame 112, a motor 114, a drive train 116, a cable drum 118 and a level wind mechanism 120. The cable drum 118 includes a first flange 122, a second flange 124 and a barrel 126. The barrel 126 extends between and connects the first flange 122 and the second flange 124. The level wind mechanism 120 includes a level wind gear 128 and a screw 130. The cable 104 extends from the rescue hoist 110 and is configured to raise and lower objects to and from the aircraft 100. The motor 114 is connected to the hoist frame 112 and is configured to operate the drive train 116, which is configured to transmit rotational power from the motor 114 to the cable drum 118. The level wind mechanism 120 extends through the cable drum 118 and is configured to wind or unwind the cable 104 onto or from the barrel 126 in orderly fashion between the first flange 122 and the second flange 124 by translating the cable drum 118 back and forth along a direction defined by a longitudinal axis A via the screw 130.

Referring still to FIG. 1B, the rescue hoist 110 further includes a control system 150 configured to control operation of the rescue hoist 110. In various embodiments, the control system 150 is coupled to a control module 152, which is connected to a control input device 154 (or a plurality of control input devices) via a control bus 156. The control module 152, which in various embodiments may be considered a component of the rescue hoist 110, includes circuitry configured to control operation of the rescue hoist 110 in response to inputs (or signals) received from the control input device 154. In various embodiments, the control module 152 is also coupled to a storage device 158 via a storage bus 160, with the storage device 158 configured to store data reflecting a record of all the control inputs received by the control module 152. As described further below, in various embodiments, the control bus 156 and the storage bus 160 may comprise, for example, a Controller Area Network ("CAN-Bus"), a Mark 33 Digital Information Transfer System ("ARINC429-Bus") or a similar network system or bus. In various embodiments, for example, the control bus 156 comprises a Dual CAN Bus—e.g., a first controller area network bus ("a first CAN-Bus") and a second controller area network bus ("a second CAN-Bus")—that is configured to provide a DAL B level of reliability in operation of the rescue hoist 110, while the storage bus 160 comprises a Single CAN-Bus—e.g., a third controller area network bus ("a third CAN-Bus")—configured to provide a DAL C level of reliability in operation of the storage device 158. Similarly, in various embodiments, the control bus 156 comprises a Dual ARINC429-Bus—e.g., a first ARINC429 bus ("a first ARINC429-Bus") and a second ARINC429 bus ("a second ARINC429-Bus")—that is configured to provide a DAL B level of reliability in operation of the rescue hoist 110, while the storage bus 160 comprises a Single ARINC429-Bus—e.g., a third ARINC429 bus ("a third ARINC429-Bus")—configured to provide a DAL C level of reliability in operation of the storage device 158. For simplicity, in the discussion that follows, the Dual CAN-Bus and the Dual ARINC429-Bus may be referred to interchangeably as a "Dual-Bus," typically comprising a "first-Bus" (or a first bus) and a "second-Bus" (or a second bus), while the Single CAN-Bus and the Single ARINC429-Bus may be referred to interchangeably as a "Single-Bus," typically comprising a "third-Bus" (or a third bus).

Language describing the various Design Assurance Levels ("DAL") discussed in this disclosure are set forth in Federal Aviation Administration Advisory Circular AC29-C2 and summarized as follows:

| | |
|---|---|
| DAL A | Catastrophic - Failure may cause deaths, usually with loss of the airplane. |

| | |
|---|---|
| DAL B | Hazardous - Failure has a large negative impact on safety or performance, or reduces the ability of the crew to operate the aircraft due to physical distress or a higher workload, or causes serious or fatal injuries among the passengers. |
| DAL C | Major - Failure significantly reduces the safety margin or significantly increases crew workload. May result in passenger discomfort (or even minor injuries). |
| DAL D | Minor - Failure slightly reduces the safety margin or slightly increases crew workload. Examples might include causing passenger inconvenience or a routine flight plan change. |
| DAL E | No Effect - Failure has no impact on safety, aircraft operation, or crew workload. |

Additional details of the control bus 156 and the storage bus 160 and the DAL: standards or levels of reliability they enable are provided in the following discussion.

Figure 2:
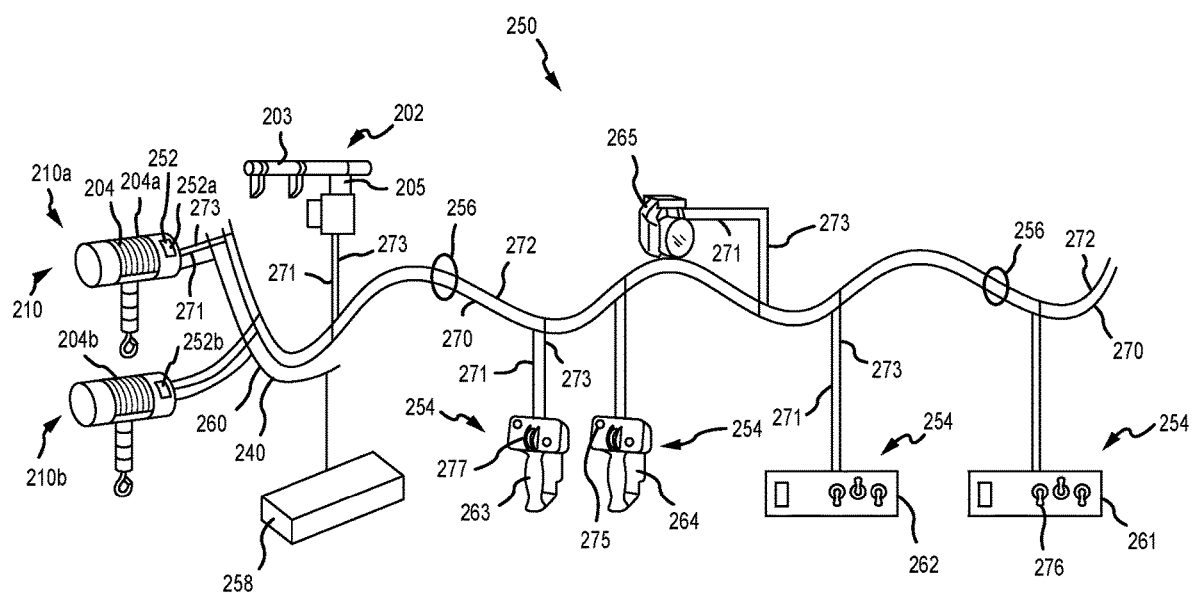
FIG. 2 is a schematic diagram of a control system for a hoist, in accordance with various embodiments.

Referring now to FIG. 2, a control system 250 is illustrated, the control system being, in various embodiments, part of a rescue system for an aircraft. The control system 250 is similar to the control system 150 described above with reference to FIG. 1B and configured to control operation of a first rescue hoist 210a and, in various embodiments, a second rescue hoist 210b, both of which are similar to the rescue hoist 110 described above with reference to FIGS. 1A and 1B. In various embodiments, one or both of the first rescue hoist 210a and the second rescue hoist 210b are configured for attachment to a support frame 202, similar to the support frame 102 described above with reference to FIG. 1A. The first rescue hoist 210a is operable to raise and lower a first cable 204a and includes a first control module 252a. Similarly, the second rescue hoist 210b is operable to raise and lower a second cable 204b and includes a second control module 252b. For simplicity, the control system 250 is described below as configured to operate a rescue hoist 210 as a single unit, comprising a cable 204 and a control module 252, each of which is similar to the like-named components described above with reference to FIGS. 1A and 1B, rather than describe operation of both the first rescue hoist 210a and the second rescue hoist 210b and their related components just described.

Still referring to FIG. 2, in various embodiments, the control system 250 includes a control bus 256, similar to the control bus 156 described above with reference to FIG. 1B. The control bus 256 is configured to transmit control signals, bidirectionally, between a control input device 254, similar to the control input device 154 described above with reference to FIG. 1B, and the control module 252 connected to the rescue hoist 210. In various embodiments, the control input device 254 includes one or more of a pilot panel 261, a cabin panel 262, an operator pendant 263 and a trainee pendant 264. Generally, each of the foregoing embodiments of the control input device 254 includes one or more input mechanisms—e.g., a push button 275, a toggle switch 276 or a thumb wheel 277—configured to control operation of the rescue hoist 210. For example, the one or more input mechanisms—e.g., the push button 275 or the toggle switch 276—may be configured to raise or lower the cable 204 or to stop or start raising or lowering the cable 204. Likewise, in various embodiments, each of the foregoing embodiments of the control input device 254 includes input mechanisms configured to control operation of the support frame 202, which operation may include activating a motor disposed within or proximate the support frame 202 to rotate a support frame arm 203 in a clockwise or counterclockwise direction with respect to a support frame post 205. In various embodiments, one or both of the first rescue hoist 210a and the second rescue hoist 210b are secured to the support frame 202 or the support frame arm 203.

In various embodiments, the control bus 256 comprises a first-Bus 270 and a second-Bus 272, each of which is configured to couple together the rescue hoist 210, the support frame 202 and the control input device 254, including one or more of the pilot panel 261, the cabin panel 262, the operator pendant 263 and the trainee pendant 264. In various embodiments, the first-Bus 270 and the second-Bus 272 operate using a common protocol, thereby enabling a component to be plugged into the control bus 256 without the need for separate wire runs from the component to, for example, the control module 252 or the control input device 254. For example, a searchlight 265 may be incorporated into the control system 250 by connecting the searchlight 265 to the first-Bus 270 via a first stub 271 and to the second-Bus 272 via a second stub 273. Similarly, each of the rescue hoist 210, the support frame 202 and the control input device 254 may be connected to the first-Bus 270 via a first stub 271 and to the second-Bus 272 via a second stub 273.

Still referring to FIG. 2, the control system 250 further includes or is coupled to a storage device 258, which may comprise componentry typically found in a flight recorder device. In various embodiments, the storage device 258 is coupled to the control module 252 via a storage bus 260, which may comprise a third-Bus 240, similar to either the first-Bus 270 or the second-Bus 272 described above. In various embodiments, the storage device 258 and the storage bus 260 are similar to the storage device 158 and the storage bus 160 described above with reference to FIG. 1B. In various embodiments, the storage device 258 is configured to store data reflecting a record of all the control inputs (or signals) received by the control module 252 via the control input device 254, including one or more of the pilot panel 261, the cabin panel 262, the operator pendant 263 and the trainee pendant 264. Typically, the storage device 258 is configured to receive data only, thus the third-Bus 240 may be configured to provide unidirectional transmission of data only, though the disclosure contemplates bidirectional transmission of data, such that operability of the storage device 258 may be reported to an operator of the aircraft—e.g., by displaying a status signal on the pilot panel 261 or the cabin panel 262.

During operation, the control system 250 is configured to provide two inputs (or two sets of data or input signals) to the control module 252 based on the inputs sent by the control input device 254 in response to a manipulation (e.g., operation of the push button 275, the toggle switch 276 or the thumb wheel 277). A first signal is transmitted on the first-Bus 270 and a second signal is transmitted on the second-Bus 272. In various embodiments, upon receipt of the two inputs by the control module 252, the control module 252 will compare the two inputs and direct the rescue hoist 210 to either respond accordingly or take no action. For example, the pilot panel 261 may be manipulated—e.g., via the push button 275—to command the rescue hoist 210 to raise the cable 204 by directing an appropriate command signal to the control module 252. The command signal is transmitted to the control module 252 via a first signal on the first-Bus 270 and via a second signal on the second-Bus 272. The control module 252 compares the first signal against the second signal. If the first signal and the second signal both correspond to the same command—e.g., to raise the cable 204—then the control module 252 directs the rescue hoist 210 to raise the cable 204. On the other hand, if the control module 252 determines the first signal and the second signal both do not correspond to the same command, then no action is taken by the control module 252.

Figure 3:
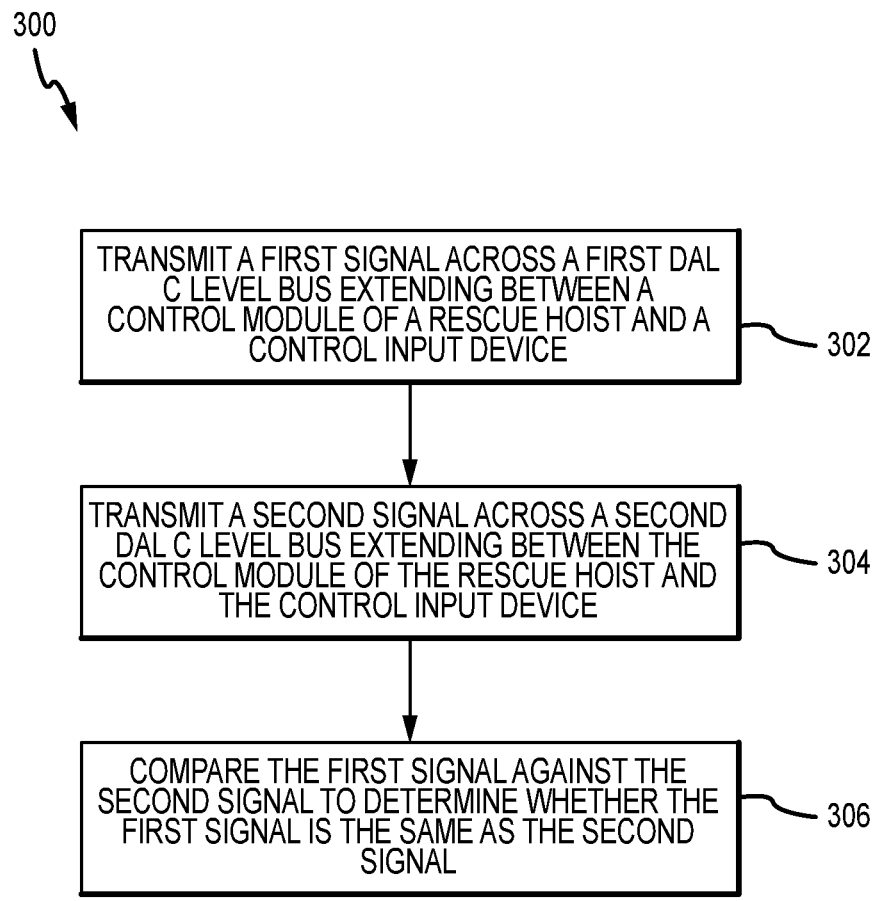
FIG. 3 is a flowchart depicting a method of providing a DAL B level of reliability for a rescue hoist in an aircraft, in accordance with various embodiments.

Referring now to FIG. 3, a method 300 of controlling a rescue hoist in an aircraft is described, the method, in various embodiments, providing a DAL-B level of reliability. In various embodiments, a first step 302 includes transmitting a first signal across a first bus extending between a control module of the rescue hoist and a control input device, the first bus, in various embodiments, defining a DAL C level of reliability. Similarly, a second step 304, generally carried out simultaneously with the first step, includes transmitting a second signal across a second bus extending between the control module of the rescue hoist and the control input device, the second bus, in various embodiments, defining the DAL C level of reliability. A third step 306 includes comparing the first signal against the second signal to determine whether the first signal is the same as the second signal.

In various embodiments of the method, the control module is configured to respond to a command signal generated by the control input device, the command signal embodied in the first signal and the second signal, when the control module determines the first signal is the same as the second signal. In various embodiments, the control module is also configured to not respond to the command signal generated by the control input device in response to the control module determining that the first signal is not the same as the second signal.

A Dual-Bus architecture is disclosed per the above description and in accordance with various embodiments. In various embodiments, the operation described above results in a DAL B level of reliability of all hoist functions, notwithstanding each of the first-Bus 270 and the second-Bus 272 is typically considered to provide DAL C levels of reliability when operating as standalone buses. The Dual-Bus architecture provides a DAL B level of reliability in operation of a rescue hoist with minimal wiring—e.g., by eliminating discrete wiring between the rescue hoist and the various control input devices—thereby saving weight and reducing complexity. The Dual-Bus architecture also provides a standardization in software between components, enabling components to be repaired or replaced as line replaceable units and facilitating integration of control hierarchy into the control system. The Dual-Bus architecture also provides redundancy into the system in the event one of the first-Bus or the second-Bus experiences failure or otherwise becomes compromised.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed:

1. A control system for a rescue hoist attached to an aircraft, comprising:
    a first bus extending between a control module of the rescue hoist and a control input device; and
    a second bus extending between the control module of the rescue hoist and the control input device,
    wherein the first bus is configured to transmit a first signal from the control input device to the control module and the second bus is configured to transmit a second signal from the control input device to the control module, both the first signal and the second signal being generated by the control input device in response to a manipulation of the control input device;
    the control module is configured to compare the first signal against the second signal; and
    the control module is configured to respond to a command signal generated by the control input device, the command signal embodied in the first signal and the second signal, when the control module determines the first signal is the same as the second signal.

2. The control system of claim 1, wherein the control module is configured to not respond to the command signal generated by the control input device when the control module determines the first signal is not the same as the second signal.

3. The control system of claim 2, wherein the control system defines a DAL B level of reliability.

4. The control system of claim 1, wherein the first bus comprises one of a first CAN-Bus or a first ARINC429-Bus and defines a DAL C level of reliability.

5. The control system of claim 4, wherein the second bus comprises one of a second CAN-Bus or a second ARINC429-Bus and defines the DAL C level of reliability.

6. The control system of claim 5, wherein the control system defines a DAL B level of reliability.

7. The control system of claim 1, further comprising a storage device coupled to the control module via a storage bus and configured to store a command signal generated by the control input device, the command signal embodied in the first signal and the second signal.

8. The control system of claim 7, wherein the storage bus comprises a third bus.

9. A rescue system for an aircraft, comprising:
  a rescue hoist;
  a control input device configured to provide a command signal to the rescue hoist;
  a first bus extending between a control module of the rescue hoist and the control input device; and
  a second bus extending between the control module of the rescue hoist and the control input device,
  wherein the first bus is configured to transmit a first signal from the control input device to the control module and the second bus is configured to transmit a second signal from the control input device to the control module, both the first signal and the second signal being generated by the control input device in response to a manipulation of the control input device;
  the control module is configured to compare the first signal against the second signal; and
  the control module is configured to respond to the command signal, the command signal embodied in the first signal and the second signal, when the control module determines the first signal is the same as the second signal.

10. The rescue system of claim 9, wherein the control module is configured to not respond to the command signal when the control module determines the first signal is not the same as the second signal.

11. The rescue system of claim 10, wherein the first bus defines a DAL C level of reliability and the second bus defines the DAL C level of reliability.

12. The rescue system of claim 11, wherein a control system comprising the first bus and the second bus defines a DAL B level of reliability.

13. The rescue system of claim 12, further comprising a storage device coupled to the control module via a third bus and configured to store the command signal.

14. A method of controlling a rescue hoist for an aircraft, comprising:
  transmitting a first signal across a first bus extending between a control module of the rescue hoist and a control input device;
  transmitting a second signal across a second bus extending between the control module of the rescue hoist and the control input device; and
  comparing the first signal against the second signal to determine whether the first signal is the same as the second signal;
  wherein the control module is configured to respond to a command signal generated by the control input device, the command signal embodied in the first signal and the second signal, when the control module determines the first signal is the same as the second signal.

15. The method of claim 14, wherein the control module is configured to not respond to the command signal generated by the control input device when the control module determines the first signal is not the same as the second signal.

* * * * *